C. H. BISSELL.
CONDUIT OUTLET BOX FITTING.
APPLICATION FILED MAY 18, 1914.

1,250,130.

Patented Dec. 18, 1917.

UNITED STATES PATENT OFFICE.

CARL H. BISSELL, OF SYRACUSE, NEW YORK, ASSIGNOR TO CROUSE-HINDS COMPANY, OF SYRACUSE, NEW YORK, A CORPORATION OF NEW YORK.

CONDUIT-OUTLET-BOX FITTING.

1,250,130.  Specification of Letters Patent.  Patented Dec. 18, 1917.

Application filed May 18, 1914. Serial No. 839,322.

*To all whom it may concern:*

Be it known that I, CARL H. BISSELL, a citizen of the United States, and a resident of Syracuse, in the county of Onondaga and State of New York, have invented a certain new and useful Conduit-Outlet-Box Fitting, of which the following is a specification.

This invention has for its object the production of an electric conduit fitting and particularly a fitting adapted to support a fixture as a lamp socket and shade holder, and it consists in the combinations and constructions hereinafter set forth and claimed.

In describing this invention, reference is had to the accompanying drawings, in which like characters designate corresponding parts in all the views.

Figure 1:
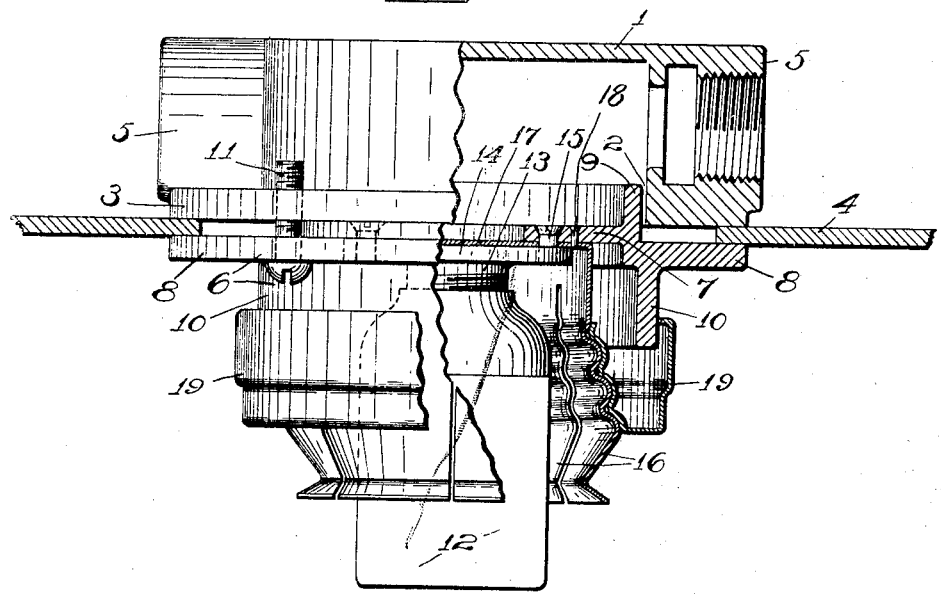
Figure 1 is an elevation, partly in section, of this fitting.
Figure 2:
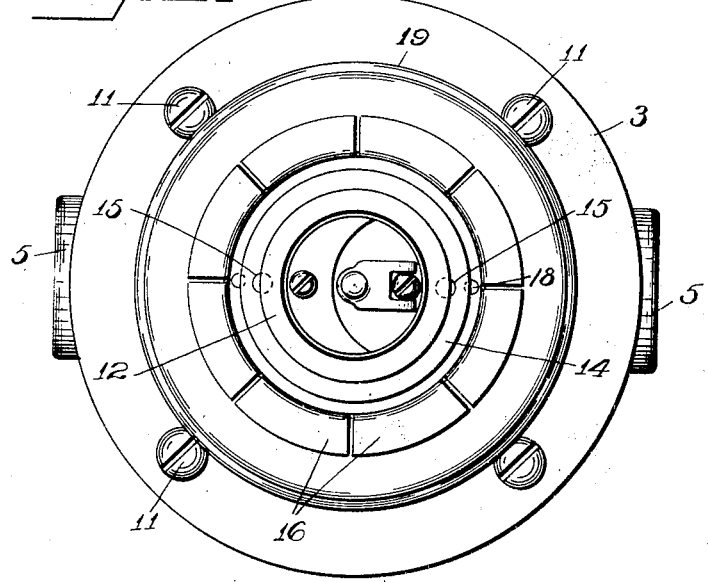
Fig. 2 is an inverted plan looking upwardly in Fig. 1.

This fitting includes, generally, a conduit outlet box having an opening in its front side and means for connection with an electric conduit, a fixture support mounted on the front or open side of the box and being connected to the box, and a fixture as a lamp socket and shade holder carried by the support.

The fixture support is usually provided with a flange extending into the opening of the box, means as a flange opposed to a bearing face on the box, and with means for clamping the former means or flange toward and from said bearing face from the front side of the box and the support.

1 is a conduit outlet box having an opening 2 in its front or lower side, and a flange 3 around the opening, the front or lower face of the flange being a bearing face which bears against the lining 4 of a wall and toward which is clamped the support to be presently described. The box is also provided with one or more laterally extending nipples 5 for connection with an electrical conduit which incloses the line wires, the flange 3 overlying the nipples 5.

6 is the fixture support having internal and external circumferential flanges 7, 8 arranged at an angle to the portions of the support on opposite sides of the flanges 7, 8. For convenience, the box 1 is considered as arranged with its opening in the lower side thereof and the flanges 3, 7, 8 arranged in horizontal position. Said portions above and below the flanges 7 and 8 are for convenience referred to as upper and lower circumferential vertical flanges 9 and 10. As the opening 2 is round, the flanges 7 and 8 are annular and the flanges 9 and 10 are cylindrical. The external annular flange 8 is opposed to the flange 3 and is clamped toward the same by any suitable means as screws 11 extending through said flanges. By circumferential, as applied to the flanges, is meant extending around the fitting or endless.

This fitting is designed to be used in connection with electric passenger cars and the like, and the box 1 is concealed behind the lining of the wall of the car and the support 6 exposed within the car and the lining 4 is clamped between the flanges 8 and 3.

The internal annular flange 6 supports the fixture which in this instance is a lamp socket and shade holder. The lamp socket 12 is provided with a threaded passage at its upper end which receives the hollow threaded plug 13 of a carriage which also includes a flange 14 lapping the lower face of the flange 7, suitable screws 15 being passed through the flanges 7 and the flange 14. The lamp shade holder consists of a contractile shell 16 having a bottom 17 which is interposed between the flanges 7 and 14 and secured to the flange 7 by rivets 18. The lamp shade holder also includes a clamping nut 19 screwing on the conical periphery of the expansible and contractile shell 16.

The upper cylindrical flange 9 extends into the opening 2 of the box and lies contiguous to the wall of said opening. The lower cylindrical flange 10 incloses a portion of the shell 16 and is spaced apart from, and extends into an annular cavity provided in the nut 19.

In use, the box 1 is located behind the lining of a car and the fixture support in front thereof and the lining of the car is clamped between the box and fixture support.

What I claim is:—

1. The combination of a conduit outlet box having an opening in its front side and an external bearing face on the front side thereof, of a fixture having a support provided with a flange extending into the opening, means opposed to said bearing face on the box, and means for clamping the last mentioned means toward the bearing face from the front side of the box and the support, and a fixture carried by the support, substantially as and for the purpose described.

2. The combination of a conduit outlet box having an opening in its front side, the box also having an annular bearing face around the opening, of a fixture support having a flange opposed to said bearing face, means for clamping the flange toward the bearing face, and a fixture carried by the support, substantially as and for the purpose specified.

3. The combination of a conduit outlet box having an opening in its front side, of a fixture support having a flange for telescoping with the opening, and a flange for coacting with the box around the opening, means for clamping the latter flange toward the box, and a fixture carried by the support, substantially as and for the purpose set forth.

4. The combination of a conduit outlet box having an opening in its front side, the box also having an annular bearing face around the opening, of a fixture support having a flange opposed to said bearing face, means for clamping the flange toward the bearing face, the support also having a flange telescoping into said opening, and a fixture carried by the support, substantially as and for the purpose described.

5. The combination with a conduit outlet box having an opening in its front or lower side and means for connection with an electric conduit, of a fixture support having a continuous circumferential vertical flange extending into said opening, and internal and external circumferential horizontal flanges, a fixture supported by the internal horizontal flange, and fastening means securing the external horizontal flange to the conduit outlet box, substantially as and for the purpose described.

6. The combination with a conduit outlet box having an opening in the front side thereof and means for connection with an electric conduit, of a fixture support having a circumferential vertical flange extending into said opening, and internal and external horizontal flanges, the support also including a depending flange inclosing a portion of the fixture, and fastening means for securing the external horizontal flange to the conduit outlet box, substantially as and for the purpose specified.

7. The combination with a conduit outlet box having an opening in its front or lower side, and an external bearing face around the opening, of a fixture having an internal horizontal flange, and an external horizontal flange opposed to said bearing face, a fixture carried by the internal flange and fastening means passing through the external horizontal flange into the bearing face, substantially as and for the purpose set forth.

8. The combination with a conduit outlet box having an opening in one side thereof, and an external bearing face around the opening, of a fixture support having an internal horizontal flange and an external horizontal flange opposed to said bearing face, fastening means passing through the external horizontal flange into the bearing face, a fixture supported by the internal horizontal flange, the support also including circumferential upper and lower vertical flanges, the upper flange extending into the opening of the box and the lower flange inclosing a portion of the fixture, substantially as and for the purpose described.

9. The combination with a conduit outlet box having an opening in the front or lower side thereof, and an external bearing face around the opening, of a fixture support having an internal circumferential horizontal flange and an external circumferential flange opposed to said bearing face, fastening means passing through the external flange into the bearing face, a fixture supported by the internal flange and including an expansible and contractile shell for holding a lamp shade and a nut for contracting the shell, the nut being formed with an annular recess in its upper face, the support also including upper and lower circumferential vertical flanges, the upper flange extending into the opening of the box, and the lower flange being cylindrical and inclosing a portion of the fixture, and extending into the recess of the nut, substantially as and for the purpose specified.

10. The combination with a conduit outlet box having an opening in the front or lower side thereof, and laterally extending nipples for connection with conduits, the box also having a flange around the opening and overlying the nipples, of a fixture support having an external horizontal flange opposed to the flange of the box, and an internal flange for supporting the fixture, and fastening means extending through the opposing flanges of the box, and the fixture support, substantially as and for the purpose set forth.

11. The combination of a conduit outlet box having an opening in the front or lower side, and an annular bearing face around said opening, of a fixture support having internal and external annular flanges, the external annular flange being opposed to said bearing face, means for clamping the external flange toward said bearing face, a lamp socket carrier having a flange opposed to the internal annular flange, a lamp shade holder including a shell having a base inserted between the lamp socket carrier and the internal annular flange, and fastening screws extending through the internal annular flange, and into the flange of the lamp socket carriage, substantially as and for the purpose described.

In testimony whereof, I have hereunto signed by name in the presence of two attesting witnesses, at Syracuse, in the county of Onondaga, in the State of New York, this 21st day of April, 1914.

CARL H. BISSELL.

Witnesses:
WM. CORNELL BLANDING,
C. C. SCHOENECK.